July 19, 1966     M. E. FUENTEVILLA     3,261,110
DRYING TRAY
Filed June 6, 1963
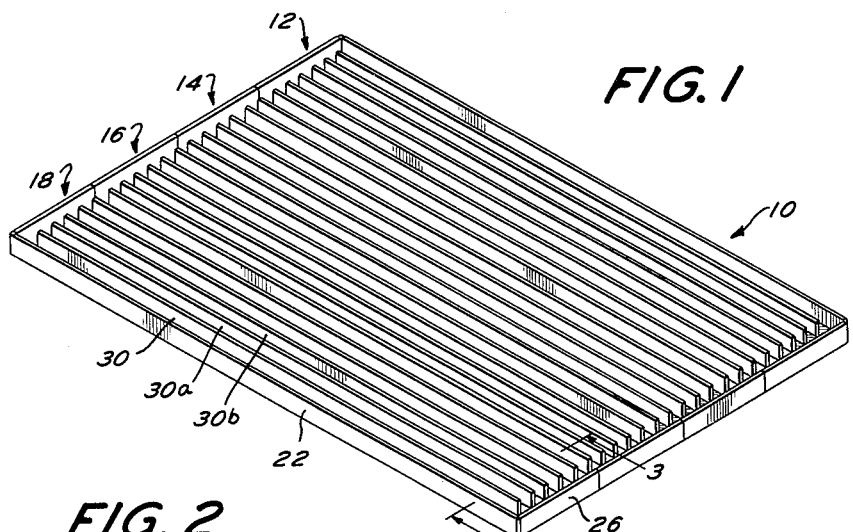
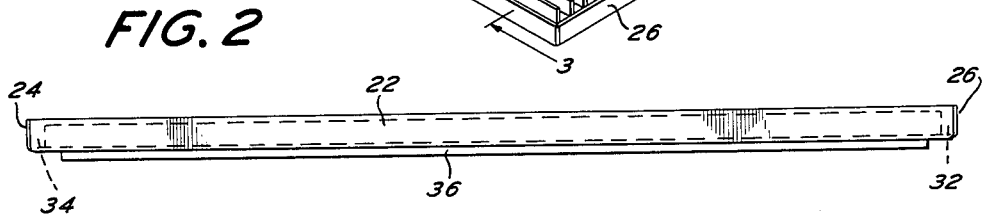
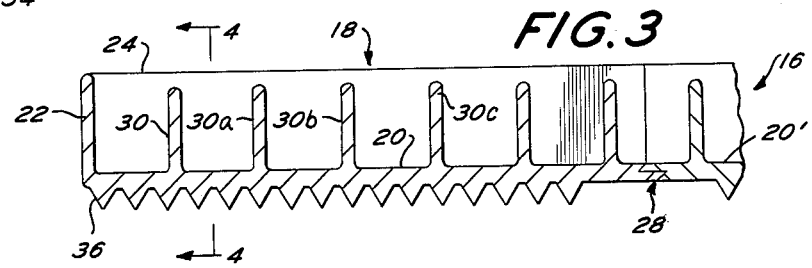
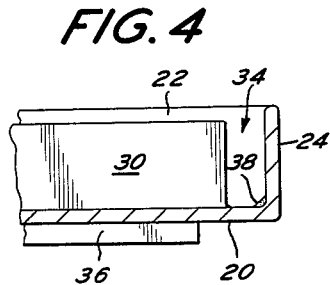
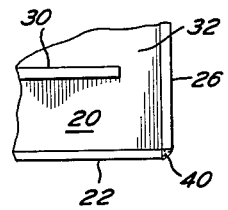
INVENTOR.
MANUEL E. FUENTEVILLA
BY
Arthur H. Seidel
ATTORNEY

United States Patent Office 3,261,110
Patented July 19, 1966

3,261,110
DRYING TRAY
Manuel E. Fuentevilla, Haddonfield, N.J., assignor, by mesne assignments, to Pennsalt Chemicals Corporation, Philadelphia, Pa., a corporation of Pennsylvania
Filed June 6, 1963, Ser. No. 286,078
6 Claims. (Cl. 34—237)

This invention relates to a drying tray, and more particularly, to an extended surface tray for supporting articles while the articles are being subjected to freeze drying or vacuum drying processes.

Industry is making wide use of freeze drying and vacuum drying techniques in the preparation of many products. Such products include extracts, citrus juices, meats, milk, blood, bones, soup, etc. During such processes, moisture is removed from the products so that they may be stored indefinitely without refrigeration. Modern processing of such articles requires that the same be accomplished without impairment or loss of natural flavor, vitamin content, color or quality.

The tray of the present invention is structurally interrelated in a manner which results in acceleration of the drying cycle. The tray provides a high ratio of heating surface to product mass. Heat is conducted from the bottom of the tray and, in turn, radiated and conducted to the product. The bottom of the tray is irregular in cross section, and preferably is provided with downwardly extending projections whereby the surface area on the bottom of the tray is substantially increased thereby facilitating the introduction of more heat to the product in a given period of time. As a result thereof, the time cycle is reduced without interfering with uniformity and quality of the product.

It is an object of this invention to provide a novel extended surface tray which is sanitary and can be manufactured economically.

It is another object of the present invention to provide a ribbed tray for drying purposes which materially increases the surface area thereof whereby the drying cycle period may be materially reduced.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a perspective view of a tray in accordance with the present invention.

FIGURE 2 is a side elevation view of the tray illustrated in FIGURE 1.

FIGURE 3 is a sectional view taken along the line 3—3 in FIGURE 1.

FIGURE 4 is a sectional view taken along the line 4—4 in FIGURE 3.

FIGURE 5 is a partial top plan view illustrating a corner of the tray in FIGURE 1 on an enlarged scale.

Referring to the drawing in detail, wherein like numerals indicate like elements, there is shown in FIGURE 1 a tray designated generally as 10.

The tray 10 is comprised of a plurality of sections designated generally as 12, 14, 16 and 18. While four such sections are illustrated, it will be appreciated that a greater or lesser number of sections may be utilized as desired. The sections 12 and 18 are mirror images, while the sections 14 and 16 are identical. Sections 12 and 18 are substantially identical with sections 14 and 16 except for the provision of upstanding longitudinally extending side walls on the former.

Thus, it is deemed sufficient to only describe section 18 in detail. Section 18 includes a bottom wall 20. As illustrated more clearly in FIGURE 3, the bottom wall 20 is on the same plane as bottom wall 20' of section 16. The bottom walls 20 and 20' are joined by a rabbeted joint designated generally as 28.

The bottom wall 20 of section 18 is provided with upstanding integral end walls 24, 26 and a longitudinally extending, integral upstanding side wall 22. When joining sections 16 and 18, a seam weld will be provided along the length of the rabbeted joint 28.

The bottom wall of each of the sections is provided with integral upstanding ribs 30, 30a, 30b, 30c, etc. Each of the ribs has a height which is less than the height of the side wall 22 and the end walls 24 and 26. Each of the ribs has a length which is less than the length of the bottom wall of the tray 10, thereby resulting in the gaps 32 and 34. The gaps 32 and 34 provide communication between the channels on opposite sides of the various ribs. The lowermost surface of the bottom wall of the tray 10 is provided with downwardly directed projections 36. Each of the projections 36, as illustrated, is two sides of an equilateral triangle, with the projections being immediately adjacent one another. The provision of the projections 36 substantially doubles the surface area of the lowermost surface of the tray 10 thereby enabling the drying cycle to be reduced by approximately 15 to 20 percent.

The tray 10 is manufactured as follows:

Each of the sections 12, 14, 16 and 18 is extruded aluminum. The endless strips of extruded aluminum are cut into various lengths corresponding to the length of the desired tray. Thereafter a portion of the ends of each rib is milled or otherwise removed. The sections are then seam welded along the rabbeted joints to form the composite tray with the sections oriented as illustrated in FIGURE 1.

Thereafter the ends of the side walls will be notched or undercut as illustrated at 38 in FIGURE 4 to facilitate bending of the bottom wall upwardly to form the end wall, such as end wall 24. Thereafter, the end wall on the sections 12 and 18 will be welded to the side walls thereof as illustrated more clearly in FIGURE 5 by the weld 40.

Thereafter, the tray 10 may be cleaned and anodized to render the same sanitary for supporting food products. When being used for vacuum or freeze drying, the food products will be disposed on the bottom wall of the tray between the ribs 30, 30a, 30b, 30c, etc. The height of the food products in the channels between the ribs will correspond to the height of the ribs. The gaps 32 and 34 facilitate the more rapid removal of vapor resulting from drying and/or sublimation of moisture in the products supported by the tray and facilitate ease of cleaning the tray. Increased vapor removal may be attained by perforating the bottom wall of the tray. The increased surface area on the bottom of the tray 10 enables the heat to be more rapidly directed to the product and facilitates the introduction of a larger amount of heat to the product in any given period of time, thereby reducing the time cycle for a particular product by between about 15 to 20 percent.

The present invention may be embodied in other specific forms without departing from the spirit or essential attributes thereof and, accordingly, reference should be made to the appended claims, rather than to the foregoing specification as indicating the scope of the invention.

I claim:

1. An open drying tray for drying material supported thereby comprising a bottom wall, first and second end walls, first and second side walls, said walls being fixed to and extending upwardly from and substantially perpendicular to the upper surface of the bottom wall, spaced substantially parallel straight ribs fixed to said surface of said bottom wall and extending upwardly therefrom substantially parallel to said side walls, the length of the ribs being less than the distance between said first and second end walls thereby defining first and second gaps at opposite ends of the bottom wall, said gaps providing communication between channels on opposite sides of said ribs, and spaced substantially parallel straight projections fixed to a bottom surface of said bottom wall, said projections materially increasing the surface area of the lowermost surface of said bottom wall.

2. A tray in accordance with claim 1 wherein said ribs and projections are integral with said bottom wall, the height of said projections being less than the height of said ribs.

3. A tray in accordance with claim 1 wherein said projections are triangular in cross section, and wherein said tray comprises a plurality of sections which are interconnected by means of seams provided on each section.

4. A tray comprising a bottom wall, first and second end walls, first and second side walls, said walls being fixed to and extending upwardly from and substantially perpendicular to the upper surface of the bottom wall, spaced substantially parallel straight ribs fixed to said surface of said bottom wall and extending upwardly therefrom substantially parallel to said side walls, the length of the ribs being less than the distance between said first and second walls thereby defining first and second gaps at opposite ends of the bottom wall, said gaps providing communication between channels on opposite sides of said ribs, spaced substantially parallel straight projections fixed to the bottom surface of said bottom wall, said projections being triangular in cross section, and said projections extending in a substantially parallel direction to said side walls and said upwardly extending ribs.

5. An open drying tray for drying materials supported thereon comprising an integral extruded bottom wall having upwardly projecting ribs and downwardly extending projections, integral upstanding side walls on said bottom wall, said ribs and projections extending substantially parallel to said side walls, integral first and second end walls on said bottom wall, said end walls extending upwardly substantially perpendicular to the uppermost surface on said bottom wall, said walls, ribs and projections being made from aluminum having an anodized coating.

6. A tray in accordance with claim 5 wherein the length of said ribs and projections is less than the distance between said first and second end walls thereby defining gaps adjacent the end walls, said gaps providing communication between channels on opposite sides of said ribs.

References Cited by the Examiner

UNITED STATES PATENTS

| | | | |
|---|---|---|---|
| 1,349,458 | 8/1920 | Johnson | 34—238 |
| 1,808,617 | 6/1931 | Thompson | 165—47 |
| 2,073,724 | 3/1936 | Baker | 263—47 |

FREDERICK L. MATTESON, JR., *Primary Examiner.*

WILLIAM F. O'DEA, *Examiner.*

B. L. ADAMS, *Assistant Examiner.*